(12) United States Patent
Garrison

(10) Patent No.: US 8,206,083 B2
(45) Date of Patent: Jun. 26, 2012

(54) CARBON HYDROSTATIC FACE SEAL

(75) Inventor: Glenn M. Garrison, Perkiomenville, PA (US)

(73) Assignee: Stein Seal Company, Kulpsville, PA (US)

( * ) Notice: Subject to any disclaimer, the term of this patent is extended or adjusted under 35 U.S.C. 154(b) by 1189 days.

(21) Appl. No.: 12/011,480

(22) Filed: Jan. 25, 2008

(65) Prior Publication Data

US 2008/0310953 A1    Dec. 18, 2008

Related U.S. Application Data

(60) Provisional application No. 60/897,621, filed on Jan. 26, 2007.

(51) Int. Cl.
*F01D 11/00* (2006.01)
*F04D 29/08* (2006.01)

(52) U.S. Cl. .................. 415/111; 415/230; 277/400

(58) Field of Classification Search .................. 415/110, 415/111, 112, 113, 171.1, 229, 230; 277/401, 277/399, 400, 408
See application file for complete search history.

(56) References Cited

U.S. PATENT DOCUMENTS

| 3,383,033 A | 5/1968 | Moore |
| 5,284,347 A | 2/1994 | Pope |
| 2009/0051120 A1* | 2/2009 | Munsell et al. ............... 277/400 |

* cited by examiner

*Primary Examiner* — Dwayne J White
(74) *Attorney, Agent, or Firm* — Michael Crilly, Esq.

(57) ABSTRACT

A force balanced seal for use with a rotor in the turbomachine has a member in opposed facing disposition to the rotor with a face dam portion of the member having a surface parallel with the sealing surface of the rotor, a groove in the member facing the rotor and bounding the face dam surface, an air bearing surface in the member facing the sealing surface of the rotor, a second passageway through the member from the air bearing surface to a radially outwardly facing surface of the member and a first passageway through the member from the groove to a member surface facing oppositely from the air bearing surface. An operating clearance between the seal and rotor is maintained by a closing force, exerted through a plurality of springs, and an opposing opening force created by pressurized air venting through the second passageway to the first passageway.

35 Claims, 6 Drawing Sheets

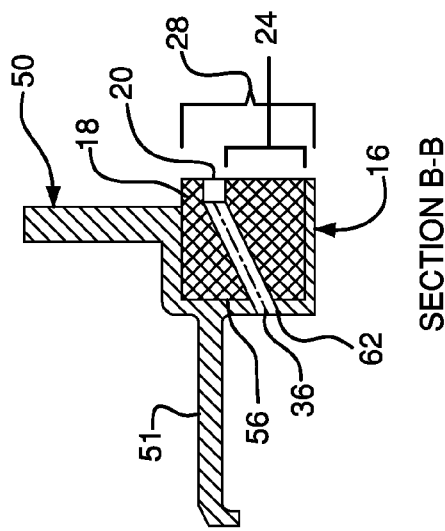
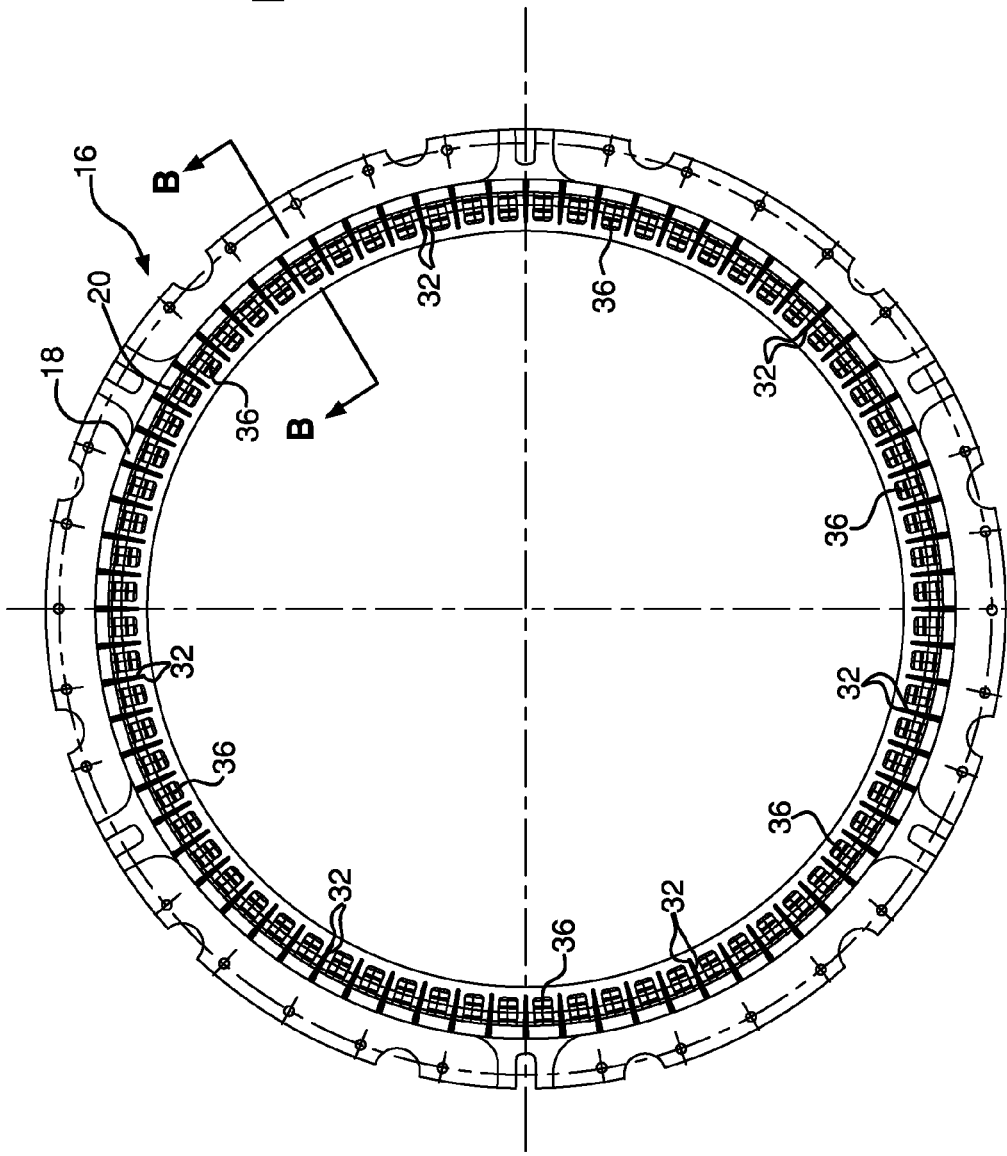
FIG. 7
FIG. 6

CARBON HYDROSTATIC FACE SEAL

CROSS REFERENCE TO RELATED PATENT APPLICATION

This patent application claims priority from Provisional U.S. Patent Application Ser. No. 60/897,621 entitled CARBON HYDROSTATIC FACE SEAL and filed on Jan. 26, 2007.

FIELD OF THE INVENTION

The present invention relates to an apparatus and method for sealing compartments within a turbine engine. More specifically, the present invention relates to seals in gas turbine engines that restrict fluid flow between rotating and stationary engine members.

BACKGROUND OF THE INVENTION

In the context of gas turbine engines, maintenance of highly pressurized air is essential for the functionality of the engine. If air is allowed to leak across these seals, this may significantly diminish the functionality of engine itself. For example, air leakage can lead to increase fuel consumption, reduce engine efficiency, and increase maintenance costs by increasing turbine inlet temperatures. Additionally, leakage of liquids into a high pressure compartment of a turbine engine also affects performance of the equipment where the seal is used. Specifically, lubricant leakage during static or dynamic situations can lead to oil coking, engine fire or the production of noxious odor therefrom. Accordingly, in many gas turbine applications it is important that seals maintain each fluid in its respective compartment without allowing uncontrolled leakage.

Typically, labyrinth seals are employed at specified sealing locations to control leakage of high pressure gas, e.g. gas discharged from a compressor, from a high pressure area to a low pressure area. Labyrinth seals operate by throttling gas flow through a series of annular constrictions formed between annular teeth, which may be located on a rotating component, and an annular rub strip, which may be located on a stationary engine member. The rub strips are abradable to allow the teeth to rub lightly during dynamic operating conditions, such as thermal transients or maneuvering loads. The effectiveness of these labyrinth seals is dependent on keeping the radial clearance between the rub strip and teeth to a minimum. However, the minimum radial clearance is limited by manufacturing tolerances, rotor concentricity control, and thermal growth between rotating and stationary components. If the radial clearance is too small, this results in premature seal wear and possible engine damage. Conversely, if the radial clearance is too large, this results in excess leakage.

U.S. Pat. No. 3,383,033 discloses a gas bearing face seal as an alternative to the labyrinth seal. In the gas bearing face seal, an air bearing is used to actively control the spacing between a flow restricting tooth and a rotating sealing surface on a rotating component. A face seal ring member, which carries the restricting tooth, is supported for movement toward the rotating sealing surface. A ring seal, such as a piston ring seal, provides a secondary seal between the ring member and a stationary engine frame. During low or no power conditions the ring member and restricting tooth are biased away from the rotating sealing surface by springs. During higher power operation high pressure compressor discharge air acts on the ring to urge the ring and tooth toward the sealing surface. A portion of the high pressure discharge air is supplied to a gas bearing space between the ring and the rotating sealing surface to establish a predetermined gas bearing face clearance. Pressure forces developed in the gas bearing space oppose further motion of the ring and tooth toward the sealing surface, and permit close spacing of the restricting tooth with respect to the sealing surface by actively maintaining the predetermined clearance. Further motion of the ring and tooth toward the rotating sealing surface increases the pressure force in the air bearing space, thereby urging the ring and tooth away from the sealing surface to maintain the predetermined clearance.

While the seal as disclosed in U.S. Pat. No. 3,383,033 attempts to overcome disadvantages of the labyrinth seal, the disclosed seal itself includes a number of significant disadvantages. First, the disclosed seal does not include a means for maintaining the ring member concentric with respect to the axis of the engine or with other seal components. To this end, the seal is imbalanced and does not create an effective seal. Second, the seal as disclosed shows the ring member pressurized radially inwardly by the higher pressure region. Rings pressurized radially inwardly will deform to an out-of-round shape with reduced sealing capability unless they are sufficiently massive and stiff. Third, differential thermal growth and other effects influencing the clearance between the seal housing and face seal ring member can result in changes in pressure forces acting on seal components, which can result in poor sealing. Fourth, the seal as disclosed includes an auxiliary restrictor tooth integral with or mounted on the ring member, which adds weight to the ring member, and increases pressure closing forces on the ring member, with the result that heavy spring means must be used to bias the ring member away from the sealing surface. Finally, the seal does not efficiently vent air exiting the air bearing space and the restrictor tooth to the low pressure region.

Another alternative to the labyrinth seal is set forth in U.S. Pat. No. 5,284,347. More specifically, U.S. Pat. No. 5,284,347 describes an aspirating seal operation within a turbine engine. The face seal is normally retracted away from the rotor face during startup and shutdown conductions in the engine when there is an insufficient change in pressure between the high pressure and low pressure compartments. As pressure builds in the engine, the seal starts to close towards the rotor due to a thrust balance that develops across the area defined by the seal aspirator tooth and seal dam. The seal continues to move closer towards the rotor until the operating gas film is established by the high pressure air entering the hydrostatic gas bearing orifices. The seal reaches equilibrium when the force balance is satisfied, i.e. the opening forces equal the closing forces. However, in a static state there is no seal between the high pressure compartment and low pressure compartment. Accordingly, there is no seal to prevent any lubricant, such as oil, that may be contained within the low pressure compartment from leaking into the high pressure compartment. Leakage of liquids into the high pressure compartment adversely affects performance of the equipment where the seal is used. In case of an aircraft engines, oil leakage across the seal into a hot air side may cause oil coking or an engine fire. When an oil lubricant is used, mixing the oil with the gas could result in formation of oil coke, a byproduct of oil heated to an elevated temperature, which chemically alters the oil and is detrimental to the gas turbine. Oil coke can foul seal surfaces reducing the integrity of the seal and prevent proper bearing lubrication within the lubricant sump. Finally, oil coking often leads to a noxious odor that may flow into a passenger space of the vehicle. This odor can be unpleasant and alarming to passengers unaware of the source of the smell.

Based on the foregoing, a seal for a turbomachine is desirable that maintains the seal member in a balanced state with respect to the axis of the engine or with other seal components in both a static and dynamic condition. Moreover, a seal for a turbomachine is desirable that is adapted to separate a high pressure compartment from a low pressure compartment during a dynamic state by an operating gas film created by the seal. Furthermore, a seal for a turbomachine is desirable that is adapted to prevent lubricant movement between a low pressure compartment and a high pressure compartment in either a static and a dynamic state.

The present invention addresses, at least, the forgoing needs.

SUMMARY OF THE INVENTION

In one of its aspects, the present invention provides a force balanced seal for use in connection with a rotor in a turbomachine. The seal includes a sealing member in opposed facing disposition to the rotor. The member has a face dam portion having a surface parallel to a sealing surface of the rotor, a groove facing the rotor and bounding the face dam surface, and an air bearing surface facing the sealing surface of the rotor. A second passageway extends through the sealing member from the air bearing surface to a radially outwardly facing surface of the member. A first passageway also extends through the sealing member from the groove to a member surface facing oppositely from the air bearing surface. The seal further includes a housing means connected to a stationary part of the turbomachine for biasing the member towards the rotor. The combination of the bias and the pressure difference as between high pressure and low pressure regions on either side of the seal, when applied to the member in a direction towards the rotor, is sufficiently balanced by the combination of high pressure applied to the face dam and force resulting from outward flow of high pressure air exhausting from the second passageway in the air bearing surface, to maintain operating clearance between the member and the rotor.

Another aspect of the invention provides a force balanced seal for use in connection with a rotor in a turbomachine where the seal includes a stationary annular carbon graphite member in opposed facing disposition to the rotor. The annular carbon graphite member includes a face dam defining a radially outboard portion of the carbon graphite member, with the face dam defining a radially outboard portion of the carbon graphite member and with the face dam having a surface parallel with a sealing surface of the rotor. The carbon graphite member further includes a groove facing the rotor and defining a radially inboard boundary of the face dam surface of the annular carbon graphite member. The annular carbon graphite member yet further includes an air bearing surface, which is located radially inboard of the groove and which is parallel with the face dam surface and, therefore, parallel with the sealing surface of the rotor. The annular carbon graphite member has a second passageway through the annular carbon graphite member with the second passageway having an exhaust formed by at least one orifice in the air bearing surface of the carbon graphite member and having an inlet formed in a radially outwardly facing surface of the carbon graphite member. Within the carbon graphite member there is a first passageway running through the carbon graphite member, where the first passageway has a first entrance formed in the groove and a second entrance formed in a surface of the carbon graphite member facing oppositely from the air bearing surface.

In this aspect of the invention the seal further includes a spring connected to the stationary part of the turbomachine for biasing the carbon graphite member towards the rotor. The combination of the bias force of the spring and the pressure difference as between the high and low pressure regions on either side of the seal, when applied to the surface of the member facing oppositely from the air bearing surface, is sufficiently balanced by the combination of high pressure applied to the face dam surface and force resulting from outward flow of high pressure air from the orifices in the air bearing surface to maintain a desired operating clearance between the graphite member and the rotor during operation of the turbomachine.

In yet another one of its aspects this invention provides a hydrothrust balanced seal for reducing, to a level of operating clearance, space in structures separating areas of high pressure and low pressure within a turbomachine. In this aspect of the invention the seal includes a facing surface formed on a rotating portion of the structure separating areas of high and low pressure where the surface defines a boundary of the space that is reduced and essentially closed by the seal, and is perpendicular to the axis of the turbomachine. The hydrostatic thrust balance seal according to this aspect of the invention further includes a stationary carbon graphite member in opposed disposition to the facing surface. The carbon graphite member includes a face dam surface defining a radially outboard portion of the carbon graphite member, with the face dam having a dam surface parallel with the facing surface and adapted to contact the facing surface. In this aspect of the invention the carbon graphite member further includes a groove defining a radially inboard boundary of the face dam surface, and yet further includes an air bearing defining an exterior surface of the carbon graphite member that is radially inboard of the groove and faces towards and is parallel with the facing surface on the rotating portion of the structure. The carbon graphite member yet further includes an axially oriented first passageway in the member, opening at the exterior surface of the carbon graphite member defined by the air bearing. The carbon graphite member yet further includes a radial bore formed in the carbon graphite member, extending inwardly from a radially outwardly facing surface of the carbon graphite member to intersect the second passageway for fluid communication therebetween, thereby facilitating flow of high pressure air inwardly from the radially outboard surface of the carbon graphite member to exhaust orifices through the second passageway at the air bearing surface towards the facing surface on the rotating portion of the structure. In this aspect of the invention the carbon graphite member yet further includes a plurality of first passageways extending through the carbon graphite member from the groove to a surface of the member facing oppositely from the exterior surface of the member defined in part by the air bearing.

DESCRIPTION OF THE DRAWINGS

FIG. 6 is an elevation looking in the axial direction, of the stationary annular carbon graphite member, of which only a segment is shown in FIG. 2, with the passageways through the stationary annular carbon graphite member being illustrated therein.

FIG. 7 is a sectional view of the stationary annular carbon graphite member illustrated in FIG. 6, taken at lines and arrows B-B in FIG. 6, with shading provided to enhance drawing clarity and illustrating the first passageway extending through the sealing member.

DETAILED DESCRIPTION OF THE INVENTION

Figure 1:
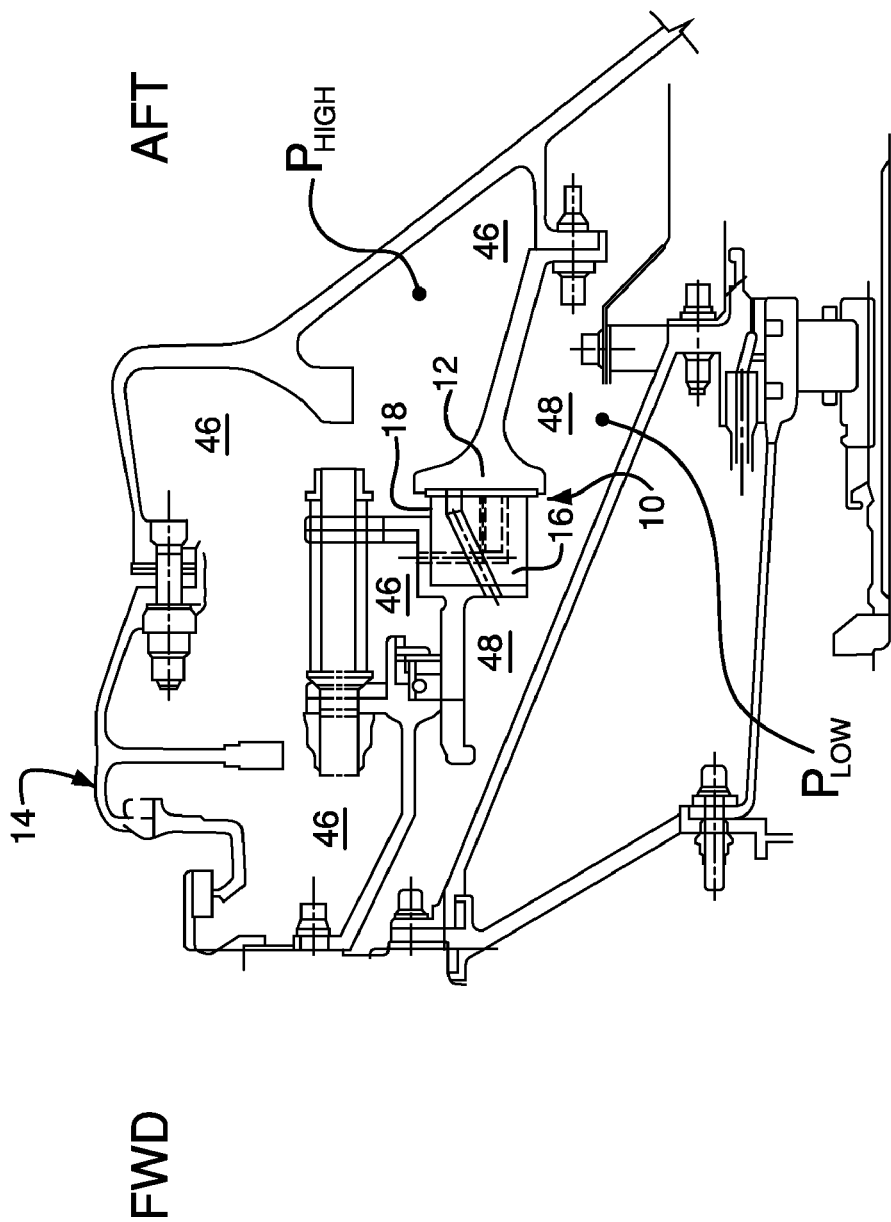
FIG. 1 is a broken schematic elevation of a portion of a turbomachine having a force balanced seal in accordance with aspects of the invention forming a part of the turbomachine.

Referring to FIG. 1, a segment of a gas turbine engine, designated generally as 14, is illustrated. More specifically, a force balanced seal, according to the present invention, is illustrated and may be considered to include a rotor, designated generally 12, which forms a part of the gas turbine engine, and a sealing assembly, designated generally as 10. The sealing assembly, discussed herein, is provided as a sealing means respecting and sometimes against the rotor 12 by a stationary annular carbon graphite member 16. To this end, the sealing assembly 10 respecting and sometimes contacting the rotor 12 provides a barrier for compartmentalizing a high pressure region 46 from a low pressure region 48.

Figure 10:
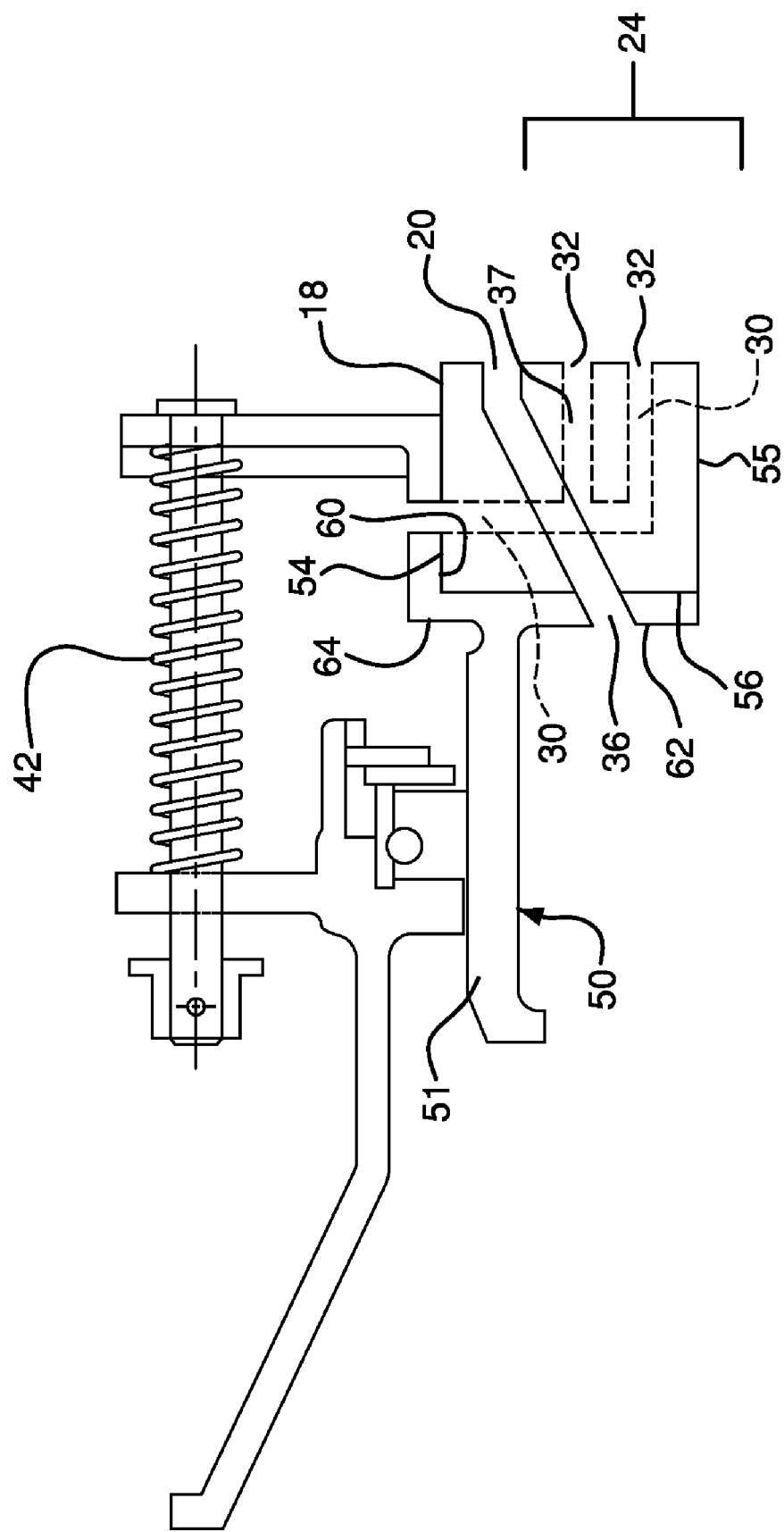
FIG. 10 is a schematic view in section of a stationary annular carbon graphite member and its support structure similar to FIGS. 4 and 5, but without the rotor being shown, to facilitate numbering and understanding of parts of the stationary annular carbon graphite member.

Referring to FIG. 10, the sealing assembly of the present invention is shown as isolated from the gas turbine engine. The sealing assembly is comprised of a stationary annular sealing member 16, an annular support housing 50, a plurality of coil springs 42, and a secondary seal, designated generally as 63. The annular sealing member 16 may be comprised of a carbon-based material, e.g. graphite, may be a circumferentially shaped ring structure, as illustrated in FIG. 6, and may be adapted to form four sides, namely, a radial outwardly facing surface 54, a radial inwardly facing surface 55, a seal face 28, and a member surface 56 facing axially and oppositely from seal face surface 28. In a preferred, but not limiting embodiment, the four sides may be the same width wherein each width may be between 0.750 and 0.800 inches. The outer diameter of the annular seal member 16 is formed by the outwardly facing surface, may be between 15.660 and 15.720 inches. The interior diameter of the sealing member is formed by the inwardly facing surface 55, may be between 14.060 and 14.125 inches.

The annular sealing member 16 may be mounted on the annular support housing 50 such that the annular support housing 50 provides the means for mounting the stationary annular carbon graphite member 16 within the gas turbine engine 14. Specifically, the radially outwardly facing surface 54 and member surface 56 are coupled to a radially inwardly facing surface 60 of a portion of an annular support housing 50. To this end, the inwardly facing surface 60 is comprised of at least two sides wherein a first side is adapted to receive at least a portion of the member surface 56 and the second side is adapted to receive at least a portion of the radially outwardly facing surface 54 where these surfaces of sealing member 16 are bound to the inwardly facing surface 60 of the housing by any bonding or coupling mechanism known in the art. As illustrated in FIG. 10, radially outwardly facing surface 54 and member surface 56 may be coupled to the annular support housing 50 such that at least two sides or approximately one-half the circumference of the seal is encased by the housing 50. As discussed in greater detail below, the annular housing 50 may be machined such that a plurality of openings in the housing may be placed into fluid communication with a plurality of first and second passageways of the annular sealing member 16.

Extending from the support housing 50, preferably at a point in opposition of the sealing face of the sealing member 16, is a weighted seal balance 51. Specifically, the seal balance 51 extends from a portion of the housing that is adapted to receive the member surface 56. The seal balance 51 extends annularly with the housing 50 and, desirably, has an outer diameter of approximately 15.500 inches. In one embodiment, the seal balance 51 provides a counter weight for forces exerted on the seal during operation such that the seal may maintain a balanced state as it rotates at high rpms about its axis.

In one embodiment, the sealing member 16 is coupled to the annular support housing 50 so as to form a face dam 18. More specifically, the face dam 18 is formed from a portion of the radially outboard facing surface 54 of the stationary annular graphite member 16 that is not bound to the annular support housing 50. In a further embodiment, the face dam 18 extends radially from the outboard facing surface/annular support housing interface substantially along the remainder of the radially outboard facing surface and along a portion of the sealing face 28. When in close proximity or even facing contact with a sealing surface 26 of rotor 12, face dam surface 18 provides a first aspect of the seal as between stationary sealing graphite member 16 and rotor 12, thereby separating regions of high pressure 46 and low pressure 48 within the gas turbine engine. In a preferred embodiment, the face dam that is part of the outwardly facing surface 54 has an external width between 0.175 and 0.185 inches. The portion of the face dam overlapping the face sealing surface 28 has a preferred radial width of approximately 0.125 inches. In a preferred, but non-limiting embodiment, the outer diameter of the face dam 18 may be between 15.660 and 15.720 inches and the inner diameter of the face dam 18 may be between 15.410 and 15.475 inches.

Figure 2:
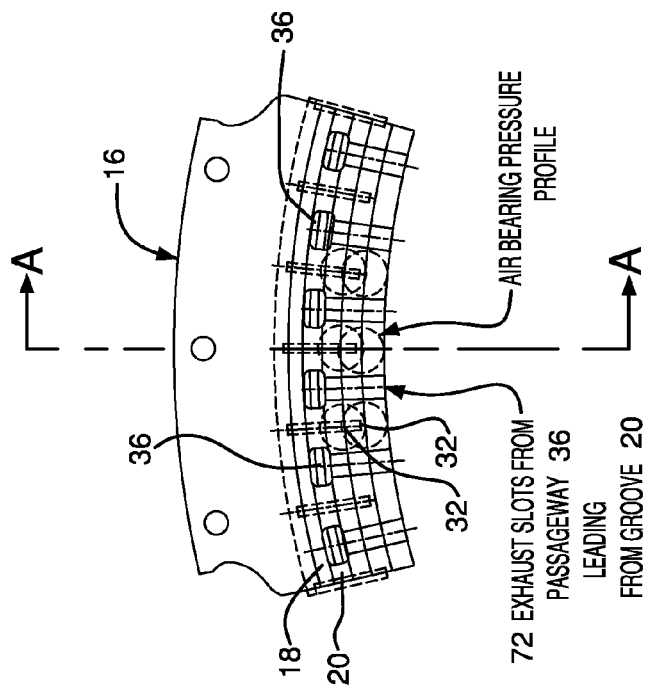
FIG. 2 is a broken view of a segment of a stationary annular sealing member, which is shown in schematic sectional form in FIG. 1, forming a portion of the force balanced seal in accordance with aspects of the invention.
Figure 4:
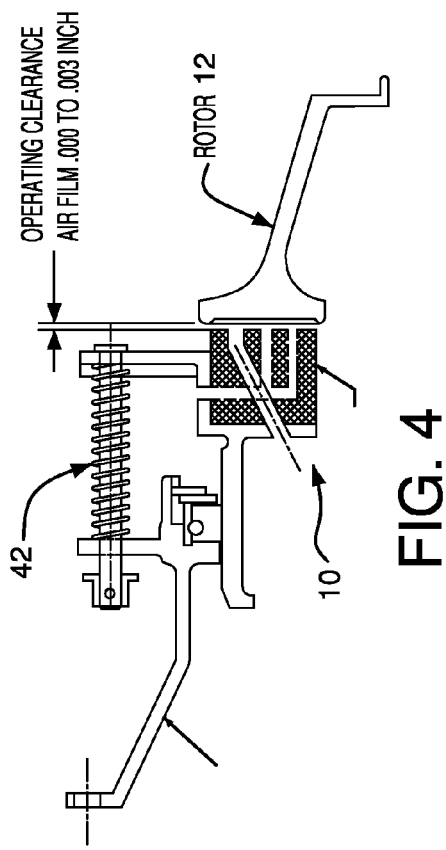
FIG. 4 is a view similar to FIG. 3 but showing in addition to the stationary annular carbon graphite member and its supporting structure, a portion of the rotor of the turbomachine, where sealing is effectuated between the rotor and the stationary annular carbon graphite member.

Referring to FIGS. 2, 6 and 7, positioned radially inboard of face dam 18 and formed within stationary sealing graphite member 16 is at least one groove 20. More specifically, the groove 20 extends annularly substantially around the sealing face 28 of the stationary annular carbon graphite member 16 concentric with and adjacent to the face dam 18. Preferably, the groove 20 is an annular recess that is parallel with the sealing face 28 with an outer diameter formed by an upper wall of the groove 20 between 15.410 and 15.475 inches and an inner diameter formed by a lower wall of the groove 20 between 15.160 and 15.225 inches. The desired width of groove 20 may be, but not is not limited to, approximately 0.145 inches.

Positioned radially inboard from the groove 20 and extending to the radial inwardly facing surface 55 is air bearing surface 24. Specifically, the air bearing surface 24 extends annularly substantially around the sealing face 28 of the stationary annular sealing member 16 concentric with and adjacent to the groove 20. Preferably, the air bearing surface 24 has an outer diameter, determined by the wall shared with groove 20, of between 15.160 and 15.225, inches and an inner diameter, determined by the wall shared with the radial inwardly facing surface 55, of between 14.060 and 14.125 inches. The desired radial width of the air bearing surface may be within the range of approximately 0.400 and 0.530 inches.

Figure 5:
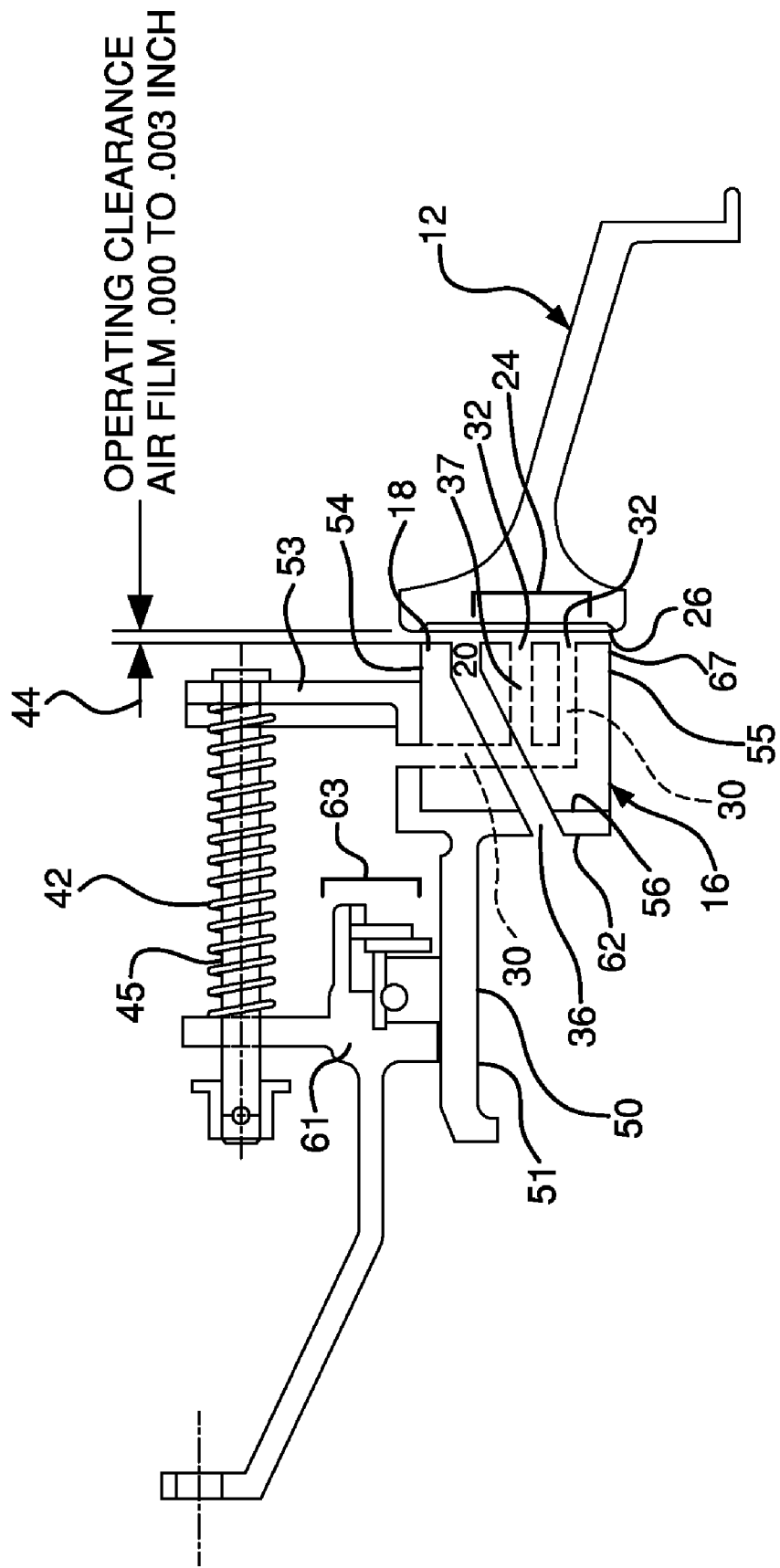
FIG. 5 is an enlarged version of FIG. 4 provided for illustrating aspects of the invention, particularly the internals of the annular carbon graphite member and its relation to the sealing surface of the rotor.

Formed within stationary annular sealing member 16 is a plurality of first passageways 36. More specifically, the plurality of first passageways 36 are spaced apart about the circumference of the annular sealing member 16 and extend from the groove 20 to a member surface 56 facing axially and oppositely from air bearing surface 28 and, preferably, through a passageway 62 in the annular support housing 50. To this end, the plurality of first passageways 36 place the grooves 20 in fluid communication with the member surface 56. As illustrated in FIGS. 1, 5 and 10, the plurality of passageways 36 also place the grooves 20 and, ultimately, air bearing surface 24 in fluid communication with the low pressure area 48 of the gas turbine engine. The first passageway 36 may extend perpendicularly from the groove 20 or, as illustrated in FIG. 7, at a downward angle across the annular seal 16. The angle of the first passageway is preferably, but not limited to, between 114 and 118 degrees downward from the sealing face 28 of the annular graphite member 16 with a resulting length of the first passageway being between 0.705 and 0.710 inches. Preferably, there are approximately 72 such first passageways evenly spaced about the circumference of the groove 20 when the dimensions of the sealing member are in accordance with the ranges provided herein.

Figure 8:
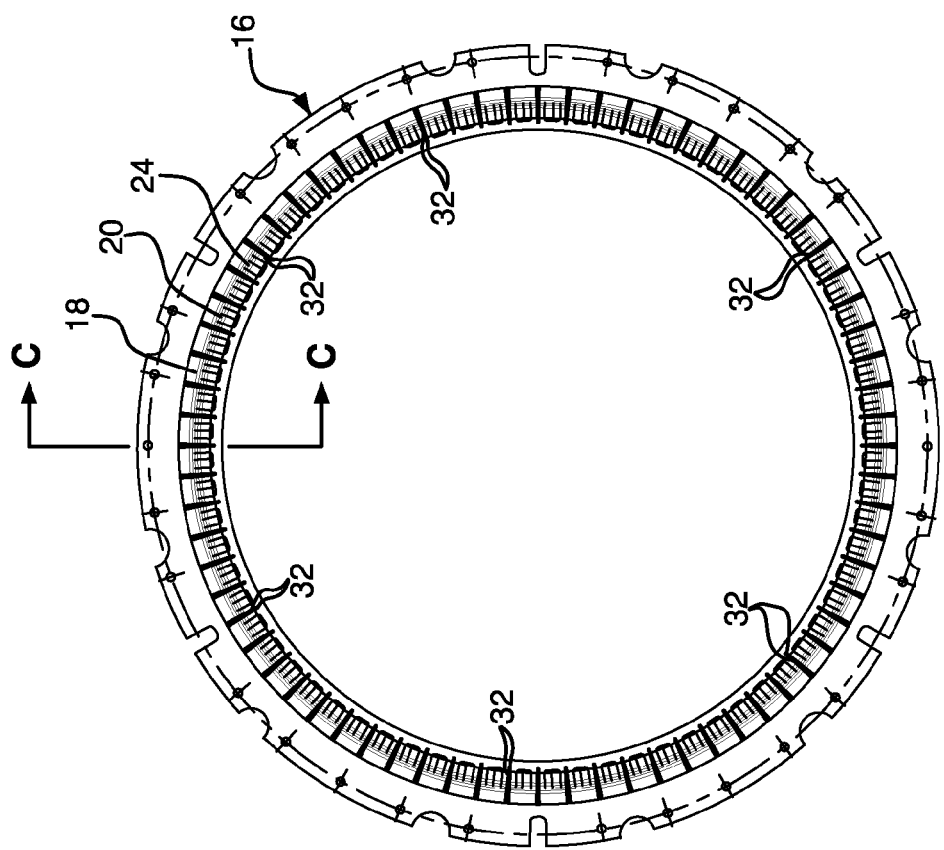
FIG. 8 is an elevation, similar to FIG. 6, of the stationary annular carbon graphite member.
Figure 9:
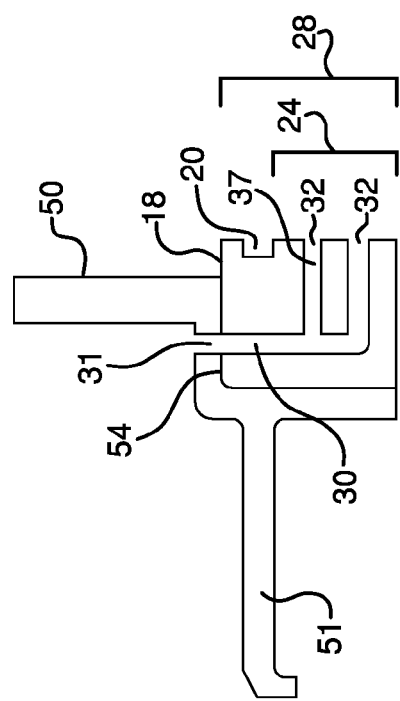
FIG. 9 is a sectional view of the stationary annular carbon graphite member and an annular support therefor taken at lines and arrows C-C in FIG. 8 and illustrating the second passageway extending through the sealing member.

Referring to FIGS. 8 and 9, also formed within stationary annular sealing member 16 are a plurality of second passageways 30. In one embodiment, the passageways 30 extend from an opening 31 in the annular support housing, through the radially outboard facing surface 54, substantially into the stationary annular sealing member 16 and through one or more orifices 32 in the air bearing surface 24. Accordingly, the second passageways 30 place the air bearing surface 24 in fluid communication with the member surface 54. Furthermore, as illustrated in FIGS. 1, 5 and 10, the second passageways 30 place the air bearing surface 24 in fluid communication with the high pressure area 46 of the gas turbine engine. In a preferred embodiment, the diameter of the orifices 32 may be approximately 0.040 inches. The diameter of the second passageway may, thereby, be uniform with the diameter of the orifices 32 or may taper to the diameter of the orifices 32.

The second passageways 30 are not limited to a single passageway passing from the member surface 54 to the air bearing surface 24. Rather, the second passageways 30 may be and are preferably comprised of one or more branches 37 therein, as illustrated in FIG. 9, wherein each branch 37 of the second passageway extends through the annular sealing member 16 to the air bearing surface 24 by way of a independent orifices 32. In one embodiment, each second passageway 30 is branched so as to extend into two separate orifices 32 wherein one orifice is radially inboard of another orifice of the same second passageway 30. The air bearing surface, therefore, may be comprised of two rows of seventy-two (72) orifices, or approximately one hundred forty-four (144) orifices, evenly spaced about the air bearing surface 24. In a further embodiment, there are approximately 72 separate second passageways spaced evenly about the periphery of the annular sealing member 16 wherein each second passageway 30 is spaced between two first passageways 36. To this end, the first and second passageways are alternately positioned about annular sealing member 16.

Referring to FIGS. 1 and 5, the annular support housing 50 and stationary annular sealing member 16 are positioned within the gas turbine engine in close proximity to the rotor 12. In one embodiment, tending to urge stationary annular sealing member 16 toward the rotor 12 and the sealing surface 26 of the rotor 12 is the force provided by a plurality of coil springs 42 supported along a plurality of pins 45. The plurality of coil springs 42 and pins 45 are positioned apart and evenly spaced around the circumference of the annular housing member 50, approximately equidistant from the perimeter of the annular carbon graphite member 16. Each spring 42 may be coupled to the annular support housing 50 by way of a flange 53. The pin 45 may be sized to fit concentrically within a hole (not illustrated) in the flange 53 such that the annular support housing 50 may slide along the longitudinal axis of the pin 45. The pin 45 may be secured to the hole by any means understood in the art such as, but not limited to, a pin, washer, cap, etc. The opposing end of each pin 45 may be coupled to an aspect of a housing 61, or any other fixed housing element in the gas turbine engine, associated with a secondary seal 63, by way of a hole or opening within the housing support structure thereof. To this end, the pin passes through the flange 53 and a hole in the housing 61 such that the coil spring 42 is held therebetween. The spring may be of any length understood in the art. However, it is desirable that the coil spring be long enough such that, when installed between the housing 61 and the flange 53, the coil spring biases the flange 53 and, ultimately, the annular carbon graphite member 16 towards the rotor 12. In a static condition, the gap between the flange 53 and housing 61 is approximately 1.391 inches. To this end, the coil springs 42 are compressed to 1.391 inches when the engine is not in operation. There may be any number of coil springs spaced about the circumference of the stationary annular carbon graphite member 16, however, it is desirable that there be enough coil springs evenly spaced such that an evenly balanced closing force is applied to the sealing member 16 toward the rotor 12.

Figure 3:
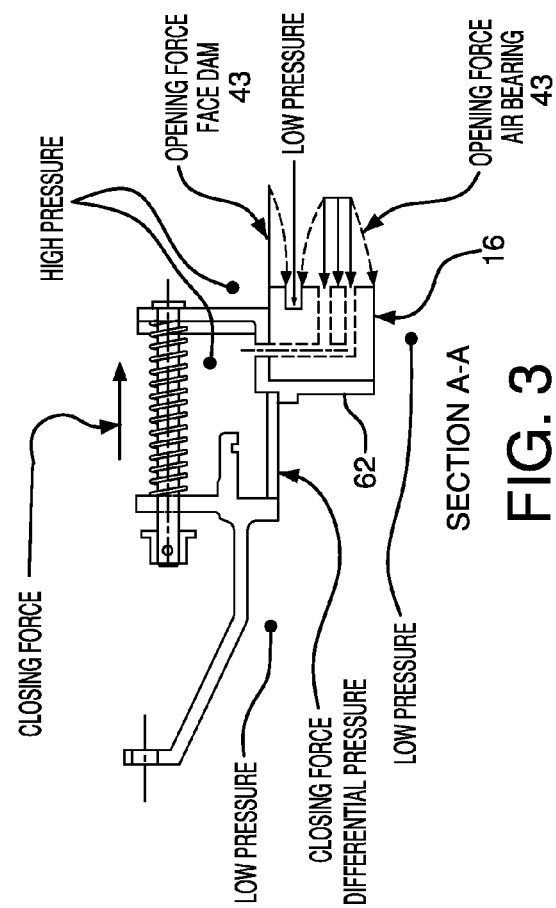
FIG. 3 is a schematic elevation in section, taken at lines and arrows A-A in FIG. 2, of parts of a force balanced seal in accordance with the invention, with arrows indicating an opening force balance on the seal member during operation.

The annular support housing 50 is movably mounted within the gas turbine engine such that the width of a small operating clearance 44 may be maintained and controlled between sealing surface 28, which includes air bearing surface 24 and face dam surface 18, and the sealing surface 26 of rotor 12. More specifically, as noted above, the coil spring 42 urges stationary annular graphite member 16 toward the rotor 12 by way of the flange 53 extending from the annular support housing 50. Because the annular support housing 50 is coupled to the radial outwardly facing surface 54 and a member surface 56, the force of the coil spring is exerted on these two surfaces. These forces are illustrated in FIG. 3 as closing forces. When the gas turbine engine is not operational these closing forces urge the annular support housing and the annular sealing member 16 toward the rotor 12 such that the air bearing surface 24 and face dam 18 contact the sealing surface 26. Thus, when the engine is non-operational, there is no operating clearance 44, illustrated in FIG. 1, or clearance between the rotor 12 and the air bearing surface 24 and the high pressure compartment 46 is completely sealed from the low pressure compartment 48.

When the turbine engine 14 is in use, however, the operating clearance 44 increases. More specifically, as indicated above, the plurality of second passages 30 place the high pressure area 46 in fluid communication with the air bearing surface 28. As such, during operation of the engine, pressurized fluid within the high pressure compartment 46 bleeds into the second passageway and through the orifices 32 to the air bearing surface 28 and by way of the face dam 18. This high pressure fluid is, thereby, directed toward the sealing surface 26 of the rotor and between the rotor and sealing member 16. Referring to FIG. 3, the exertion of the high pressure fluid on the rotor 12 results in an opening force 43 exerted on the air bearing surface 24 of the annular graphite seal 16 and creates a gas bearing between the rotor and sealing member 16. When the opening force 43 is greater than that of the closing force 42 exerted by the spring, the opening force 43 urges the annular sealing member 16 away from the rotor 12. As the annular sealing member 16 is urged away from the rotor 12 the tension on the coil springs 42, i.e. the closing force, increases. Once the closing force is equivalent to that of the opening force, forces acting on the annular sealing member 16 are balanced and the operating clearance is maintained. Again, the pressurized fluid exhausting from the orifices 32 and the face dam also acts as a gas bearing within the operating clearance. The even spacing of the orifices 32 about the periphery of the air bearing surface 24 facilitates an evenly balanced opening force about the periphery of the air bearing surface 24. To this end, the equal air flow combined with the seal balance 51 ensures that the annular sealing member 16 is evenly balanced as it is urged away from the rotor such that the operating clearance 44 is substantially the same through the entire periphery of the seal. In one embodiment, opening force 43 may create an even operating clearance between 0.00 and 0.003 inches wherein the distance between the air bearing surface 24 and the sealing surface 26 is approximately the same through the entire periphery of the annular sealing member 16.

The width of the operating clearance 44 and the overall pressure within the operating clearance 44 is also controlled, in part, by the groove 20 and first passageways 36. More specifically, as pressure builds in the operating clearance 44 from the high pressure fluid bleeding therein, this pressure may be collected within the groove 20 and vented through the first passageways 36 into the low pressure area 48. Pressurized fluid may also escape the operating clearance 44 into the low pressure compartment 48 through a gap 67 created by the balanced operating clearance 44 that is proximal to the low pressure compartment 48. The result of the first passageways 36 and the gap 67 is that the pressure within the operating clearance and the opening force 43 is controlled. To this end, the opening force 43 has an upper limit that is preferably a function of the desired operating clearance for the particular application.

Based in the foregoing, the number of first passageways 36, second passageways 30, and the placement of the orifices 32 about the annular seal 16 are a function of the desired operating clearance 44 during operation of the turbine engine. The closing force may be equal to the difference in pressure between the high pressure area and the low pressure area within gas turbine engine 14 multiplied by the surface area of an upper portion 64 of the annular support housing 50. The difference in the pressure between the high pressure area and the low pressure area and the number of second passageways 30 and exhaust openings 32 also determines opening force 43 and the pressure within the resulting operating clearance. A greater number of second passageways 30 and orifices 32 correlates with an increased opening force during engine operation as a greater number of second passages and orifices allow high pressure to air leak into the operating clearance 44. This pressure is controlled by the number of first passageways 36 within the groove 20 and the gap 67. In other words, the opening force 43 is reduced with a greater number of first passageways 36 within the groove 20, thereby, reducing the operating clearance. In one embodiment, as illustrated above, the number of first passageways 36, second passageways 30 and orifices 32 are such that the operating clearance is maintained between 0.00 and 0.003 inches. Specific embodiments of the present invention, as discussed above, contemplate approximately 72 first and second passageways and 144 orifices evenly and alternately spaced about the annular sealing member 16 within the above specification ranges. However, the present invention is not necessarily limited to this operating clearance range and these specifications. Rather, the number of first passageways 36, second passageways 30 and orifices 32 may be modified so as to allow for an alternate operating clearance range that is optimal for the targeted turbine engine and may be dependant upon the application of the engine. Alternatively, for embodiments of the present invention outside of the ranges specified the number of first passageways 36, second passageways 30 and orifices 32 may be modified so as to accommodate a target operating clearance of the particular seal.

The present invention is provides numerous advantages over the other seals known in the art. First, the present invention is advantageous because the disclosed seal provides a means to maintain the ring member concentric with respect to the axis of the engine or with other seal components. In other words, the placement of the exhaust openings and the first and second passageways about the periphery of the seal provides a balanced and effective seal. Moreover, the present seal efficiently vents air exiting the operating clearance to the low pressure region, thereby, facilitating the balanced seal. Thirdly, the present invention is advantageous because it provides a force balanced seal that is closed when the engine is in operation. To this end, the high pressure compartment is completely dissociated from the low pressure compartment such that materials contained therein are not allow to leak from the high pressure region to the low pressure region. Accordingly, the foregoing presents a apparatus and method for providing a gas turbine engine or turbo machine that minimizes air leakage from a fluid pressurized compartment during operation, while also minimizing lubricant or fluid leakage during non-operation. Additional advantages of the present invention may be further contemplated by one of ordinary skill in the art based on the disclosure provided herein.

The following is claimed:

1. A force balanced seal for use in connection with a rotor in a turbomachine, comprising:
   a) an annular sealing member in opposed facing disposition to the rotor, comprising:
      i) a face dam defining a radially outboard portion of the sealing member and having a surface parallel with a sealing surface of the rotor;
      ii) a groove radially inboard of the face dam and also facing the rotor;
      iii) an air bearing surface, located radially inboard of the groove, and being parallel with the face dam surface and therefore parallel with the sealing surface of the rotor;
      iv) at least one first passageway through the sealing member having a first entrance formed in the groove and a second entrance formed in a surface of the sealing member facing oppositely from the air bearing surface such that the first passageway is in fluid communication with a low pressure compartment of the turbomachine;

v) a second passageway through the sealing member having at least one orifice formed in the air bearing surface and an inlet formed in a radially outwardly facing surface of the member such that the second passageway is in fluid communication with a high pressure compartment of a turbomachine;

b) a spring connected to a housing of the turbomachine, for biasing the sealing member towards the rotor; wherein the combination of a first force exerted by the spring and a second force resulting from outward flow of high pressure air from the orifice in the air bearing surface maintains a desired operating clearance between the sealing member and the rotor.

2. The force balanced seal of claim 1 wherein the sealing member is comprised of a carbon-based substance.

3. The force balanced seal of claim 2 wherein the sealing member is comprised of graphite.

4. The force balanced seal of claim 1 wherein the sealing member is comprised of four surfaces, namely, a radial inwardly facing surface, a seal face, a radial outwardly facing surface, and a member surface facing oppositely from the seal face.

5. The force balanced seal of claim 4 wherein an outer diameter of the sealing member is formed by the radial outwardly facing surface and is within a range of 15.660 and 15.720 inches and an interior diameter of the sealing member is formed by the radial inwardly facing surface and is within a range of 14.060 and 14.125 inches.

6. The force balanced seal of claim 4 wherein a portion of both the member surface facing oppositely from the seal face and the radial outwardly facing surface are coupled to an annular housing of the turbomachine.

7. The force balanced seal of claim 4 wherein the four surfaces may independently be comprised of a width within the range of 0.750 and 0.800 inches.

8. The force balanced seal of claim 4 wherein the face dam portion of the sealing member extends along a portion of the radial outwardly facing surface and a portion of the seal face.

9. The force balanced seal of claim 1 wherein the groove is concentric with and adjacent to the face dam surface.

10. The force balanced seal of claim 9 wherein the groove has an outer diameter formed by an upper wall of the groove between 15.410 and 15.475 inches and an inner diameter formed by a lower wall of the groove between 15.160 and 15.225 inches.

11. The force balanced seal of claim 9 wherein the groove has a width of about 0.145 inches.

12. The force balanced seal of claim 1 wherein the air bearing surface is concentric with and adjacent to the groove.

13. The force balanced seal of claim 12 wherein the air bearing surface has a radial width of about 0400 and 0.530 inches.

14. The force balanced seal of claim 1 wherein each first passageway extends from the groove at a downward angle with respect to the seal face of the sealing member.

15. The force balanced seal of claim 14 wherein the downward angle of each first passageway is within the range of 144 and 118 degrees with respect to the seal face of the sealing member.

16. The force balanced seal of claim 1 wherein each first passageway extending through the sealing member having a length within the range of 0.705 and 0.710 inches.

17. The force balanced seal of claim 1 wherein the sealing member is comprised of 72 first passageways spaced evenly along the sealing member.

18. The force balanced seal of claim 1 wherein the orifices of the sealing member are about 0.040 inches in diameter.

19. The force balanced seal of claim 18 wherein the second passageways are of a diameter uniform with the orifices.

20. The force balanced seal of claim 1 wherein the second passageway is in fluid communication with the air bearing surface by two independent orifices.

21. The force balanced seal of claim 1 wherein 72 second passageways are spaced evenly along the sealing member.

22. The force balanced seal of claim 1 wherein 144 orifices are spaced evenly along the sealing member.

23. The force balanced seal of claim 22 wherein the orifices are arranged in two rows about the sealing face of the sealing member.

24. The force balanced seal of claim 1 wherein the operating clearance between the sealing member and the rotor is 0.00 inches when the turbomachine is non-operational.

25. The force balanced seal of claim 1 wherein the operating clearance between the sealing member and the rotor is within the range of 0.000 and 0.003 inches when the turbomachine is operational.

26. A force balanced seal for use in connection with a rotor in a turbomachine, comprising:
  a) a member in opposed facing disposition to the rotor, comprising:
    i) a face dam portion having a surface parallel with a sealing surface of the rotor;
    ii) a groove facing the rotor and bounding the face dam surface;
    iii) an air bearing surface facing the sealing surface of the rotor;
    iv) a first passageway through the member from the groove to a member surface facing oppositely from the air bearing surface;
    v) a second passageway through the member from the air bearing surface to a radially outwardly facing surface of the member; and
  b) means connected to a stationary part of the turbomachine, for biasing the member towards the rotor; wherein the combination of bias force and pressure difference as between a high pressure region and a low pressure region on either side of the seal, when applied to the member in a direction towards the rotor, is sufficiently balanced by the combination of high pressure applied to the face dam and force resulting from outward flow of high pressure air exhausting from the second passageway in the air bearing surface to maintain operating clearance between the member and the rotor.

27. A hydrostatic thrust balanced seal for reducing, to a level of operating clearance, space in structure separating areas of high and low pressure within a turbomachine, comprising:
  a) a facing surface formed on a rotating portion of the structure separating areas of high and low pressure, defining a boundary of the space that is reduced by the seal and being perpendicular to the axis of the turbomachine;
  b) a stationary sealing member in opposed disposition to the facing surface, comprising:
    i) a face dam defining a radially outboard portion of the sealing member, having a dam surface parallel with the facing surface and adapted to contact the facing surface;

ii) a groove defining a radially inboard boundary of the face dam surface;

iii) an air bearing defining an exterior surface of the sealing member that is radially inboard of the groove and that faces toward and is parallel with the facing surface on the rotating portion of the structure;

iv) a plurality of first passageways extending through the sealing member from the groove to a surface of the member facing oppositely from the air bearing surface;

v) an axially oriented second passageway in the member opening onto the face surface defined by the air bearing; and vi) a radial bore formed in the member and extending inwardly from a radially outwardly facing surface of the member to intersect the second passageway for fluid communication therebetween facilitating flow of high pressure air inwardly from the radially outboard surface of the member to exhaust through the second passageway at the air bearing surface of the member towards the face surface.

28. A method for maintaining an operating clearance between a force balanced seal and a rotor within a turbomachine comprising:

a) biasing a sealing member of the seal against a surface of the rotor by a closing force;

b) venting pressurized air from a high pressure compartment at least through a plurality of second passageways wherein the second passageways extend from an inlet formed in a radially outwardly facing surface of the sealing member to at least one orifice formed in a air bearing surface of the sealing member such that the second passageway places the air bearing surface in fluid communication with the high pressure compartment; and c) applying an opening force to the air bearing surface as a result of the venting of pressurized air through the second passageway which acts in opposition to the closing force so as to urge the sealing member away from the rotor, thereby, creating and maintaining an operating clearance between the seal and the rotor.

29. The method of claim 28 further comprising controlling the operating clearance by evenly venting pressurized air from the operating clearance through at least a first passageway extending from a groove in a sealing face of the seal.

30. The method of claim 28 wherein the sealing member is evenly biased against the surface of the rotor by the closing force.

31. The method of claim 28 wherein the operating clearance is maintained at a distance when the opening force is equal to the closing force.

32. The method of claim 28 further comprising maintaining the operating clearance within the range of 0.000 and 0.003 inches.

33. The method of claim 28 wherein the opening force is applied evenly across air bearing surface of the sealing member such that the sealing member is balanced as it is urged away from the rotor.

34. The method of claim 28 wherein the pressurized air vented from the high pressure compartment to the air bearing surface also acts as an air seal within the operating clearance.

35. A method for maintaining an operating clearance between a force balanced seal and a rotor within a turbomachine comprising:

a) biasing an air bearing surface and a dam face of a sealing member of the seal against a surface of the rotor by a closing force exerted on the sealing member by a plurality of springs connected to the housing of the turbomachine;

b) venting pressurized air from a high pressure compartment at least through a plurality of second passageways wherein the second passageways extend from an inlet formed in a radially outwardly facing surface of the sealing member to two orifices radially spaced along an air bearing surface of the sealing member such that the second passageway places the air bearing surface in fluid communication with the high pressure compartment;

c) applying an opening force to the air bearing surface as a result of the venting of pressurized air through the second passageway which acts in opposition to the closing force so as to create and maintain an operating clearance between the seal and the rotor wherein the operating clearance is maintained when the opening force is equivalent to the closing force; and d) controlling the operating clearance by venting pressurized air from the operating clearance through a first passageway extending from a groove in a sealing face of the seal wherein the first passageway extends through the sealing member to a low pressure compartment of the turbomachine.

* * * * *